United States Patent Office 2,741,574
Patented Apr. 10, 1956

2,741,574

STABLE AQUEOUS INJECTABLE PROCAINE HYDROCHLORIDE AMINOPHYLLINE PREPARATION

Robert F. Prindle, Garfield Heights, and Virginia M. Blackard, Cleveland Heights, Ohio, assignors to Strong Cobb and Company, Inc., Cleveland, Ohio, a corporation of Delaware No Drawing. Application October 30, 1951,
Serial No. 253,966

4 Claims. (Cl. 167—58)

The present invention relates to a therapeutic composition having special value as a coronary dilator and myocardial stimulant and, more particularly, comprises a preparation essentially composed of aminophylline, procaine hydrochloride and benzyl alcohol.

Aminophylline is well known as a diuretic, coronary dilator and myocardial stimulant and has been used extensively in the treatment of coronary diseases. Aminophylline is a combination of two mols of theophylline with one mol of ethylenediamine and may be represented by the formula $(C_7H_8O_2N_4)_2 \cdot C_2H_4(NH_2)_2 \cdot 2H_2O$.

It has been the accepted practice for some time to treat coronary disease, angina pectoris, dropsy and allied conditions by the intramuscular injection of an aminophylline solution containing 0.5 gram of aminophylline per 2 cc. of solution. This standard solution, however, is extremely painful upon injection and, therefore, attempts have been made to administer aminophylline through other routes, such as intravenously, because of the prevalence of pain upon intramuscular injection. The literature on this subject, however, not only discloses that intramuscular injection is the safest route for the administration of aminophylline but that intravenous administration is highly dangerous. Several recent deaths have been reported in the Journal of the American Medical Association due to the intravenous injection of aminophylline. It was primarily because of the amount of pain involved that intravenous injection and other routes of administration were considered with some favor but the inherent dangers render such highly undesirable.

It is also known to admix procaine hydrochloride with aminophylline immediately prior to intramuscular injection. 1% procaine hydrochloride was used with 0.5 gram aminophylline. While procaine hydrochloride has an anesthetic effect so that the incidence of pain is reduced by use of the admixture just indicated, such admixture must invariably be freshly prepared just prior to use, since the two components are incompatible and a precipitate is formed after the two substances stand together for even a very short period of time. The incompatibility and the formation of the precipitate are undoubtedly due to the fact that aminophylline is an amine and is, therefore, alkaline, while procaine hydrochloride is acid in character. It has, therefore, not been possible to produce a stable combination of aminophylline and procaine hydrochloride and to put such up in containers ready for use.

One of the objects of this invention is to overcome the incompatibility of aminophylline and procaine hydrochloride and to produce a safe, effective and stable preparation which can be produced and bottled or ampuled and kept ready for use at all times.

Another object of the invention resides in the incorporation of benzyl alcohol into the admixture of aminophylline and procaine hydrochloride whereby the incompatibility is overcome and a clear, stable preparation results which has indefinite keeping qualities and which is converted into a true combination.

Other and still further objects and advantages of the invention will be understood and appreciated by those skilled in this art or will be apparent or pointed out hereinafter.

In accordance with the present invention, a preferred formulation of aminophylline, procaine hydrochloride and benzyl alcohol is made up in such manner that each 2 cc. of the ultimate injectable preparation contains aminophylline 0.5 gram, procaine hydrochloride 1% and benzyl alcohol 2%. The difference in the volume between 2 cc. and the active ingredients is sterile water. We have found that such a preparation is not only clear and stable and remains so indefinitely but that this preparation is especially suitable for intramuscular injection in the treatment of coronary disease and the like and, when so injected, is not only painless or substantially painless but produces the desired therapeutic effects in a rapid and efficacious manner acting as a new combination of these substances.

The incorporation of the benzyl alcohol into the admixture of aminophylline and procaine hydrochloride not only produces a clear, stable solution of lasting keeping qualities but brings about a mutual solubilization and miscibility constituting a new combination of these substances. Thus, a preparation is produced which, in effect, has a new character both physico-chemically and therapeutically. Through a long series of tests and experimental investigations, we have discovered that the results herein set forth are fully achieved by adding 2% of benzyl alcohol to the procaine hydrochloride solution and then introducing the aminophylline. In this way a clear, stable solution is produced which has been found to have indefinite keeping qualities. The preparation is, therefore, also unusually uniform due to the complete distribution of the three components in the water solution and thus every dosage of the preparation is not only the same as every other dosage but uniform results are secured from each intramuscular injection. Thus, the only variable factor is the patient and his condition which represents a major improvement in technique and the production of the desired therapeutic effects.

We have further found that the amount of benzyl alcohol can be reduced somewhat but that a critical point exists at approximately 1% benzyl alcohol. Less than 1% benzyl alcohol will not maintain the stability of the preparation and more than 2% is unnecessary and, therefore, uneconomical. The amount of benzyl alcohol may, therefore, range from a minimum of approximately 1% up through 2% but approximately 1% has been found to be the minimum effective and operative amount. The amounts of aminophylline and procaine hydrochloride are governed by medical considerations related primarily to the proper dosage of aminophylline which is generally considered to be 0.5 gram per injection, but limited variations in the dosage of aminophylline are well established and understood by the medical profession. The amount of procaine hydrochloride need not be restricted to 1%, which is the usual and preferred amount, since we have found and demonstrated that this may range up to 2% or even somewhat above 2% but more than 2% is not ordinarily required. A product containing 2% procaine hydrochloride is, however, a definite modification of the invention.

So far as we are aware, benzyl alcohol, which may be represented by the formula $C_6H_5CH_2OH$, is unique in its action of rendering compatible the aminophylline and procaine hydrochloride and producing a clear, stable solution of excellent keeping qualities. Procaine hydrochloride is p-aminobenzoyl-diethylamino-ethanol hydrochloride and may be represented by the formula $C_{13}H_{20}O_2N_2 \cdot HCl$.

A further and important advantage of the present invention is that the stable aminophylline preparation can be packaged in an automatic injecting ampule or device such as that known in the trade as an Ampin, whereby the preparation is ready for instant use at any time but may be previously filled and stored and kept on hand in any desired amount. This was previously impossible as will be appreciated in connection with aminophylline and procaine hydrochloride.

We claim:

1. A clear, stable aminophylline solution adapted for intramuscular injection and having excellent keeping qualities each 2 cc. dosage of which consists essentially of aminophylline 0.5 gram, procaine hydrochloride 1% and at least approximately 1% of benzyl alcohol, the balance being substantially only sterile water.

2. A clear, stable aminophylline solution in accordance with claim 1, in which the amount of benzyl alcohol is approximately 1%.

3. A clear, stable aminophylline solution in accordance with claim 1, in which the amount of benzyl alcohol is approximately 2%.

4. An aminophylline preparation suitable for intramuscular injection with substantial freedom from pain due to injection and characterized by prolonged keeping qualities, the essential active components of which are aminophylline and procaine hydrochloride in the conventional amounts commonly employed in the treatment of coronary disease and allied conditions together with approximately 1-2% of benzyl alcohol, the aminophylline and procaine hydrochloride being present in a compatible and stable condition substantially uniformly distributed throughout the solution and in combination physicochemically and therapeutically.

References Cited in the file of this patent

UNITED STATES PATENTS

| | | |
|---|---|---|
| 2,187,597 | Blaso | Jan. 16, 1940 |
| 2,190,749 | Worne | Feb. 20, 1940 |

OTHER REFERENCES

Lesser Drug and Cosmetic Industry, March 1950, page 277, volume 66, Number 3.

Gutman: Modern Drug Encyclopedia, 3rd edition, Yorke Publishing Company, New York, 1946, page 40.

Remington's Practise of Pharmacy, ninth edition, 1948, page 1169, Mack Publishing Co., Easton, Pa.